May 30, 1967 F. DEKKER 3,322,364

DUAL HUB FOR REELS

Filed March 15, 1965

3 Sheets-Sheet 1

INVENTOR:
Frank Dekker

By Smyth, Roston & Pavitt
Attorneys

May 30, 1967 F. DEKKER 3,322,364

DUAL HUB FOR REELS

Filed March 15, 1965

3 Sheets-Sheet 2

INVENTOR:
Frank Dekker

By Smyth, Roston & Pavitt
Attorneys

May 30, 1967 F. DEKKER 3,322,364

DUAL HUB FOR REELS

Filed March 15, 1965 3 Sheets-Sheet 3

INVENTOR:
Frank Dekker

By Smyth, Roston & Pavitt
Attorneys 3,322,364
DUAL HUB FOR REELS
Frank Dekker, Inglewood, Calif., assignor to Minnesota Mining and Manufacturing Company, St. Paul, Minn., a corporation of Delaware
Filed Mar. 15, 1965, Ser. No. 439,808
18 Claims. (Cl. 242—68.3)

This invention relates to tape transport systems and more particularly refers to a dual hub assembly for mounting two tape reels coaxially in closely spaced relationship in a tape transport system, each reel having an axial opening to receive the hub assembly.

Many occasions arise for using two recording tape systems cooperatively. One example is the use of two magnetic recording tapes in tandem for recording signals continuously through a period of recording signals or a period of reproducing signals, which period is beyond the capacity afforded by the length of a single tape. Recording or reproducing signals is started on one tape and as the tape nears the end of its run the recording or reproducing of signals is transferred to the second tape. Another example is the common use of one tape to reproduce signals that are recorded on a second tape with both tapes running simultaneously. Still another example is the use of one tape to record signals with the other tape standing by for use in the event of failure of the operation of the first tape.

In all of these instances, two separate tape transport systems in two separate cabinets may be employed but it is highly desirable for a number of reasons to combine the two tape transport systems in a single piece of apparatus. It has been found that such a dual tape apparatus can be fabricated in compact form with savings in cost as well as savings in space if the reels for the two tapes are positioned coaxially on two closely spaced parallel decks or planes of operation. Such a coaxial double deck tape system occupies only slightly more space than a conventional single tape transport apparatus and costs only half again as much instead of twice as much.

The present invention serves this purpose by providing a double deck or dual hub assembly for mounting two reels coaxially for independent operation, one such dual hub assembly being required for two reels at corresponding ends of two tapes and a second dual hub being required for the two reels at the other corresponding ends of the two tapes. A dual hub assembly of this character comprises an axially inward hub structure to mount an inner reel and an axially outward hub structure to mount an outer reel. Certain problems arise in the construction of such a dual hub assembly.

One problem is to construct the outer hub structure of the hub assembly to retain the outer reel but also, when desired, to permit the inner reel to pass over the outer hub structure. This problem is met by providing the outer hub structure with a radially projecting portion to support the outer reel, the radially projecting portion being retractable to permit the inner reel to pass.

When each of the two coaxial hub structures is in operation it must firmly engage the corresponding reel and positively prevent axial withdrawal or slippage of the reel. For this purpose, spring loaded cam-actuated engagement means is incorporated in each of the two hub structures for radial expansion into engagement with the inner circumferential surface of the axial opening of the corresponding reel. The problem is to provide such an engagement means that may be manually released when only the outer end of the hub structure is accessible for manipulation.

This problem is met by making each of the two structures of the dual hub assembly longitudinally contractible and by making the engagement means of each hub structure releasable in response to axial contraction of the hub structure. In this regard a feature of the invention is that the inner of the two hub structures of the dual hub assembly is axially contractible in response to axial contraction of the outer hub structure. In the preferred practice of the invention the outer hub structure has an initial range of axial contraction which releases its own engagement means and has a further range of axial contraction which is transmitted to the inner hub structure to release the engagement means of the inner hub structure.

The features and advantages of the invention may be understood from the following detailed description and the accompanying drawings.

In the drawings which are to be regarded as merely illustrative:

Figures 4, 5, 6:
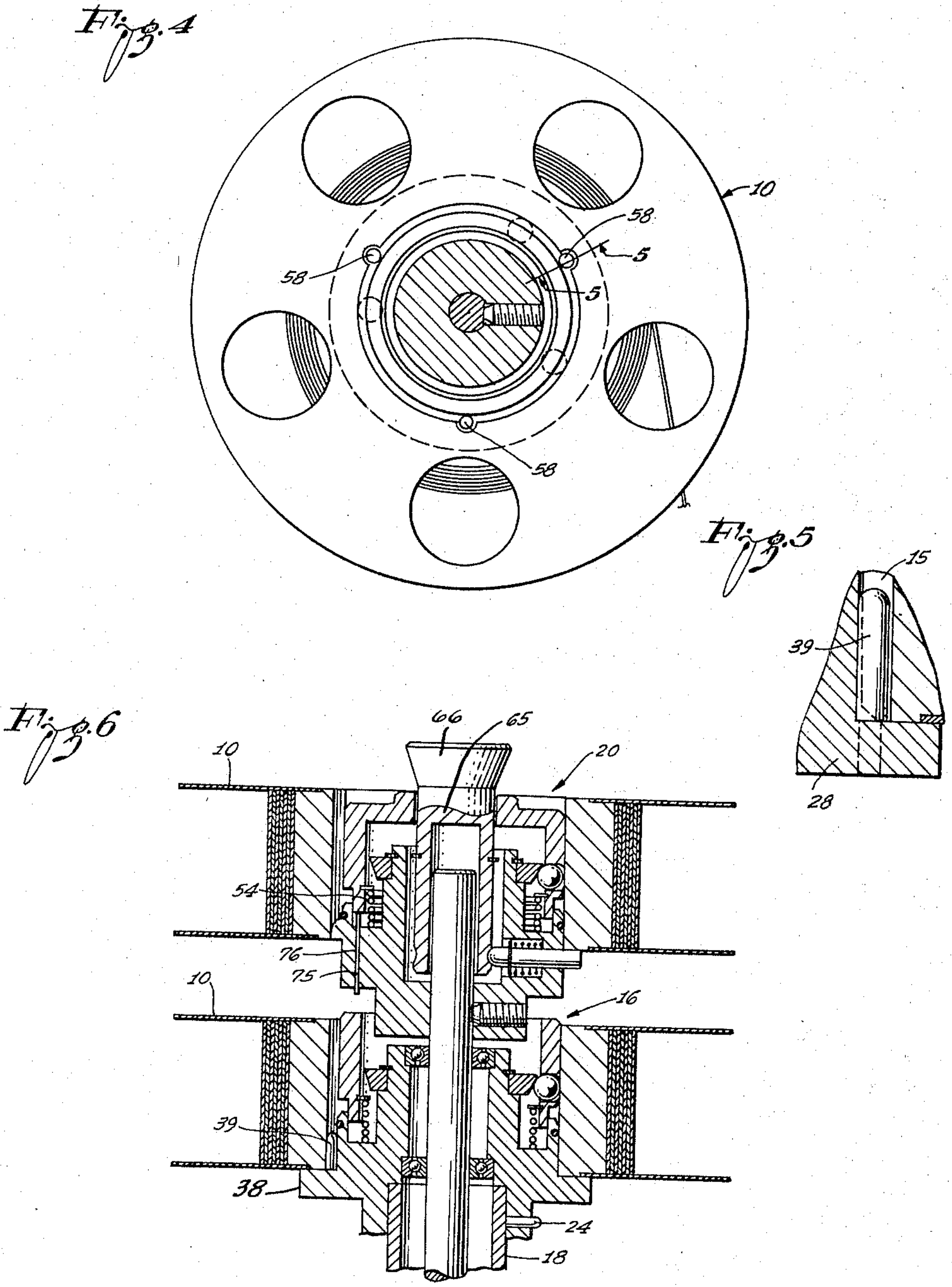
FIG. 4 is a transverse section along the line 4—4 of FIG. 2 showing how lugs in the form of longitudinal pins of the inner hub structure engage corresponding grooves in the inner reel to lock the inner reel against rotation relative to the inner hub structure.
FIG. 5 is a fragmentary longitudinal section along the line 5—5 of FIG. 4 showing one of the longitudinal pins.
FIG. 6 is a diametrical section along the line 6—6 of FIG. 1 showing how the pin of FIG. 3 is positioned to act on the inner hub structure.
Figure 7:
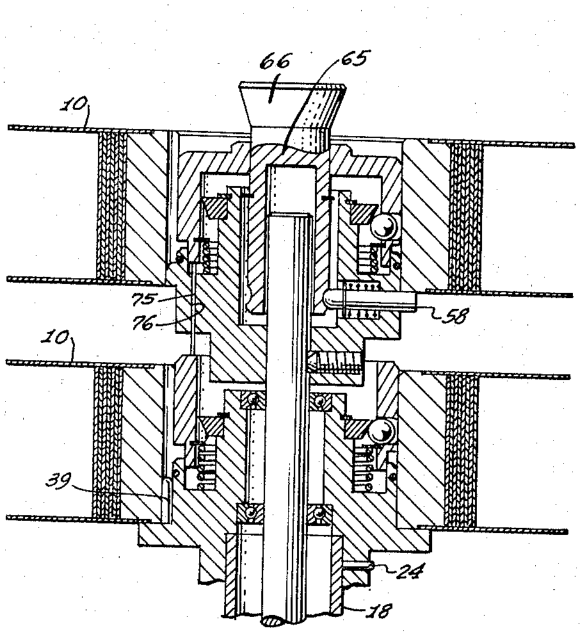
Figure 8:
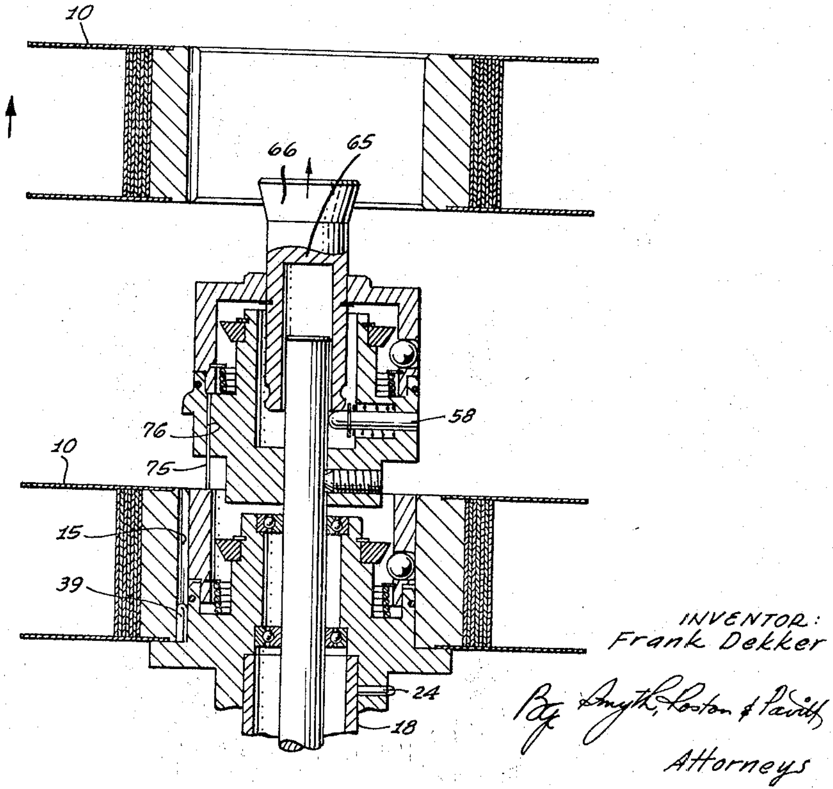

FIG. 7 is a view similar to FIG. 6 showing the outer hub structure axially contracted to a degree for release of its own engagement means without releasing the engagement means of the inner hub structure; and FIG. 8 is a similar sectional view showing the outer hub structure axially contracted beyond the state shown in FIG. 7, the further axial contraction resulting in axial contraction of the inner hub structure to release the inner reel.

Figures 1, 2, 3:
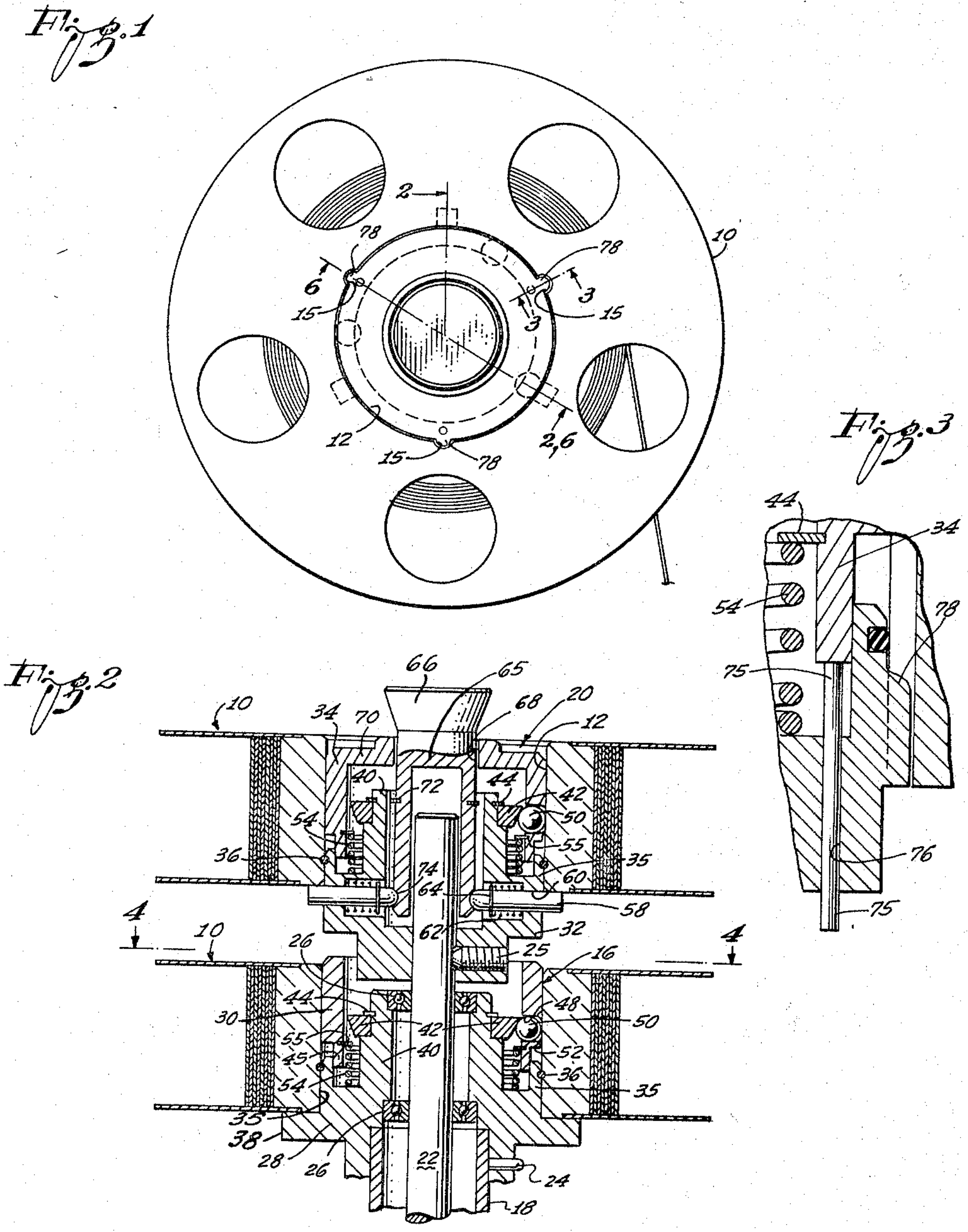
FIG. 1 is a plan view of a dual hub assembly embodying the invention and mounting a pair of inner and outer reels.
FIG. 2 is a longitudinal section taken along the angular line 2—2 of FIG. 1 showing the engagement means of the two coaxial hub structures and also showing the retractable radial projection of the outer hub structure that supports the outer reel.
FIG. 3 is a fragmentary longitudinal section along the line 3—3 of FIG. 1 showing a downwardly extending pin for transmitting axial contraction movement of the outer hub structure to the inner hub structure.

The dual hub assembly in this particular embodiment of the invention is designed to mount reels of the character shown in FIGS. 1 and 2. Each of the reels 10 is of a well known construction with a circular axial opening 12 having an inner circumferential surface with three longitudinal grooves 15 at equal circumferential spacing.

The dual hub assembly comprises a radially inner hub structure, generally designated 16 mounted on the upper end of a tubular shaft 18 and an outer coaxial hub structure, generally designated 20, mounted on the upper end of an inner concentric shaft 22. The inner hub structure 16 is secured on the tubular shaft 18 by at least one set screw 24 and the outer hub assembly 20 is secured on the shaft 22 by at least one set screw 25, the two shafts being maintained in coaxial alignment by a pair of spaced ball bearings 26 inside the inner hub assembly.

Each of the two coaxial hub assemblies 16 and 20 is constructed for axial extension and contraction and for this purpose each hub structure is made in two sections. Thus the inner hub structure 16 comprises an axially fixed inner member 28 and an axially movable outer member 30, and in like manner the outer hub structure 20 comprises an axially fixed inner member 32 and an axially movable outer member 34, the two cooperating members of each hub structure being in sliding engagement with each other.

The fixed inner member 28 of the inner hub structure 16 is formed with a short circumferential wall 35 that is dimensioned to fit into the axial opening 12 of a reel 10 and is provided with a circumscribing O-ring 36 for snug fit in the axial opening. The fixed inner member 28 is further provided with a radially projecting portion in the form of a radial flange 38 for supporting abutment against the inner face of a reel 10. Three short longitudinal pins 39 equally circumferentially spaced on the radial flange 38 serve to engage the inner longitudinal grooves 15 of a reel 10 as best shown in FIG. 5 to prevent rotation of the reel relative to the inner member 28. The axially fixed inner member 28 is further formed with a relatively long cylindrical inner wall 40 which carries a collar in the form of a conical cam 42, the collar resting against a shoulder of the inner circumferential wall and being retained by a snap ring 44.

The outer member 30 of the inner hub assembly 16 is in the form of a cylinder that is open at both ends, the inner end of the cylinder being reduced in diameter to form a cylindrical skirt 45 which slidingly telescopes inside the circumferential wall 35 of the inner fixed member 28. Thus the circumferential wall 35 of the axially fixed inner member 28 serves as a guide for the axial movements of the outer member 30.

The axially movable outer member 30 is provided with three radial apertures 48 at equal circumferential spacing to house three engagement means in the form of three metal balls 50, the outer ends of the apertures being restricted to keep the balls captive in the absence of a reel 10. A suitable coil spring 54 acting in compression between the axially fixed inner member 28 and a snap ring 55 on the outer member 30 continuously urges the outer member axially outward from the inner member.

If a reel 10 is mouned on the inner hub structure 16 as shown in FIG. 2, the outward spring pressure against the outer member 30 results in wedging of the three metal balls 50 between the conical cam 42 and the inner circumferential surface of the reel to lock the reel on the hub structure in a manner to prevent withdrawal of the reel from the radial flange 38. The reel may be unlocked or released simply by contracting the inner hub structure 16 by manual force applied axially against the outer member 30, the resultant axial movement of the outer member shifting the three metal balls 50 away from the conical cam 42. In the absence of a reel 10 on the lower hub structure, the lower hub structure is axially expanded further to a limit position at which the three metal balls 50 are displaced outward to their limits in the radial apertures 48.

The outer hub structure 20 is largely similar in construction to the inner hub member 16 as indicated by the use of corresponding numerals to indicate corresponding parts. Thus the outer hub structure 20 like the inner hub structure 16 provides three metal balls 50 to cooperate in the previously described manner with a conical cam 42 under the pressure of a compressed coil spring 54.

The outer hub structure 20 differs from the inner hub structure 16 in being provided with a radial portion to support a reel with the radial portion retractable to permit a reel to pass over the outer hub structure 20. In this embodiment of this invention the radially projecting portion of the outer hub structure 20 comprises three radial pins 58 slidingly mounted in three corresponding radial bores 60 in the circumferential wall 35 of the axially fixed inner member 32.

Any suitable means may be provided to control the radial extension and contraction of the three pins 58. In this construction, each of the three radial pins 58 is urged radially inward by a surrounding coil spring 62 that acts in compression between the circumferential wall 35 and a snap ring 64 on the pin. The three radial pins 58 are controlled by a manually operable axial plunger 65 that is mounted in the outer end of the outer hub structure 20, the plunger having an exterior operating knob as shown. The plunger 65 is slidingly mounted in a guide aperture 68 in an outer end wall 70 of the outer member 34 and is provided with a circumscribing snap ring 72 which serves as a stop in cooperation with the end wall to limit the axially outward movement of the plunger. The inner end of the plunger 65 is formed with a rounded or chamfered nose as shown and is further formed with a circumferential groove 74 for cooperation with the three radial pins 58.

When a reel 10 is mounted on the outer hub structure 20 as shown in FIG. 2, the plunger 65 is in its normal inner position at which it holds the three pins 58 in their effective outer positions, the rounded inner ends of the three pins seating in the circumferential groove 74 of the plunger. When the plunger 65 is manually retracted as shown in FIG. 8 out of the region of the three pins 58, the three pins are retracted axially inward by their individual coil springs 62. When the plunger 65 is subsequently restored to its normal position the rounded or chamfered nose of the plunger spreads the three pins 58 apart to restore the three pins to their effective positions.

As heretofore stated a feature of the invention is the concept of causing the inner hub structure 16 to contract in response to contraction of the outer hub structure 20. For this purpose an operating pin 75 which is best shown in FIG. 3 (and also shown in FIG. 6) is fixedly mounted on the lower rim of the outer member 34 of the outer hub structure 20 and extends through a longitudinal bore 76 in the axially fixed member 32. When the two hub structures 16 and 20 engage coresponding reels, the pin 75 is sufficiently retracted to avoid interference with axial expansion to the limit of the inner hub structure 16, the retracted position of the pin being shown in FIG. 7. When manual pressure is applied to the outer end of the outer member 34 of the outer hub structure 20 to contract the outer hub structure, the outer hub structure contracts sufficiently to relax its three metal balls 50 for release of the outer reel 10 as shown in FIG. 7, the three balls of the outer structure being relaxed before the pin 75 advances sufficiently to contract the inner hub assembly 20. Additional inward contraction to the limit of the outer hub assembly 20 as shown in FIG. 8, advances the pin 75 sufficiently to contract the inner hub assembly 16 and thereby relax the three balls 50 of the inner hub assembly to release the reel on the inner assembly.

As heretofore stated three longitudinal pins 39 on the inner hub structure 16 engages the three longitudinal grooves of a reel to key the reel to the inner hub structure to prevent relative rotation of the reel. For the same purpose, the outer hub structure 20 is provided with three radial means in the form of three short longitudinal ribs 78 (FIGS. 1 and 3) on the periphery of the inner member 32 to engage the longitudinal grooves 15 of a reel on the outer hub structure. Preferably the three ribs 78 are in longitudinal alignment with the three pins 39.

The manner in which the dual hub assembly functions for its purpose may be readily understood from the foregoing description. In preparation for mounting a reel 10 on the inner hub structure 16, the knob 66 is manipulated to retract the plunger 65 as shown in FIG. 8 to permit the three springs 62 to retract the three radial pins 58 out of the outer hub structure 20. With the three pins 58 out of the way, a reel 10 is placed on the outer hub structure 20 with the three longitudinal grooves 15 of the reel in axial alignment with the three ribs 78 and then the reel is moved past the outer hub structure onto the inner hub structure 16, the three longitudinal grooves of the reel passing freely over the three longitudinal ribs onto the three pins 39. If desired manual pressure may be applied to the outer end wall 70 of the outer hub structure 20 to contract both hub structures sufficiently to relax both sets of the metal balls 50 to permit the reel to pass freely to its desired alternate position against the radial flange 38 of the inner hub structure.

It is not necessary, however, to apply force to the end wall 70 for this purpose because the two hub assemblies will be contracted in turn by abutment of the reel against the two sets of metal balls 50 in sequence. Thus when the reel encounters the protruding metal balls 50 of the expanded outer hub assembly 20, the axially moving reel acting against the protruding balls forces sufficient axial contraction of the outer hub structure to relax the balls to permit the reel to pass completely over the outer hub structure. Subsequently the reel encounters the protruding metal balls 50 of the inner hub structure 16 and thereby contracts the inner hub structure axially to relax the balls and permit the reel to reach its final position against the radial flange 38. It is apparent, then, that with the knob 66 retracted, a reel 10 may be mounted on the inner hub structure 16 by simply forcing the reel axially over the two hub structures in one movement until the reel encounters the radial flange 38 of the inner hub structure. The reel is then automatically locked in place by the three metal balls 50 of the inner hub assembly.

After a reel is mounted on the inner hub structure 16 in this manner, the knob 66 is depressed to restore the radial pins 58 to their outer effective positions and then a second reel is telescoped over the ribs 78 of the outer hub structure 20 against the three radial pins 58. Here again, manual force may be applied to the outer end wall 70 of the outer hub structure 20 for the purpose of relaxing the corresponding metal balls but if desired the reel may be simply forced against the protruding metal balls 50 to cause sufficient contraction of the outer hub structure to relax the balls.

To remove the two reels from the dual hub assembly, first the outer hub assembly 20 is contracted by manual pressure against the end wall 70 sufficiently to relax the corresponding three metal balls 50 to permit the outer reel to be withdrawn. The knob 66 is then pulled to its outer position shown in FIG. 8 to retract the three radial pins 58. Manual pressure is again applied to the end wall 70 of the outer hub structure 20 sufficiently to contract the inner hub structure 16 to relax the three metal balls of the inner hub structure to release the inner reel for withdrawal. As the inner reel is withdrawn and passes over the outer hub structure 20 the three longitudinal grooves 15 of the reel ride over the three longitudinal ribs 78 of the outer hub structure.

My description in specific detail of the selected embodiment of the invention will suggest various changes, substitutions and other departures from my disclosure within the spirit and scope of the appended claims.

I claim:

1. In an apparatus for rotatably mounting two closely spaced coaxial reels having axial openings with longitudinal grooves therein, the combination of:
   closely spaced inner and outer axially aligned hub structures to mount an inner reel and an outer reel respectively;
   radially extending support means on the two hub structures respectively to abut the inner faces of the two reels respectively, and
   the support means on the outer hub structure being radially retractable to permit the inner reel to pass over the outer hub structure.

2. In an apparatus for rotatably mounting two closely spaced coaxial reels having axial openings with longitudinal grooves therein, the combination of:
   closely spaced inner and outer axially aligned hub structures to mount an inner reel and an outer reel respectively;
   radially extending support means on the two hub structures respectively to abut the inner faces of the two reels respectively,
   the support means on the outer hub structure being radially retractable to permit the inner reel to pass over the outer hub structure; and
   means on the two hub structures respectively to releasably engage the two reels respectively to hold the two reels against retraction from the two corresponding support means.

3. A combination as set forth in claim 2 which includes means on the outer end of the outer hub structure that is manually operable to release the two engaging means on the two hub structures.

4. A combination as set forth in claim 3 in which said manually operable means has a first range of operation to release the engaging means in the outer hub structure and a second range of operation to release the engaging means on the inner hub structure.

5. In an apparatus for mounting two closely spaced coaxial inner and outer reels respectively which reels have axial openings with inner longitudinal grooves therein, the combination of:
   a first tubular shaft;
   an axially inner hub structure mounted on the tubular shaft and having a concentric portion to fit into the axial opening of the inner reel;
   radially projecting support means on the inner hub structure to abut the inner face of the inner reel;
   means on the inner hub structure to engage at least one longitudinal groove of the inner reel to prevent rotation of the inner reel relative to the inner hub structure;
   first engaging means on the inner hub structure to releasably engage the inner reel inside the aperture thereof to hold the inner reel against axial retraction from the support means;
   a second inner shaft extending through the tubular shaft coaxially thereof;
   an axially outer hub structure to fit into the axial opening of the outer reel, the outer hub structure being on the second inner shaft adjacent the inner hub structure;
   second radially projecting support means on the outer hub structure to abut the inner face of the outer reel,
   said second support means being radially retractable to clear the axial opening of the inner reel to permit the inner reel to pass axially over the outer hub structure; and
   second engaging means on the outer hub structure to releasably engage the outer reel to hold the outer reel against axial retraction from the second support means.

6. A combination as set forth in claim 5 which includes means on the outer end of the outer hub structure to release both of said engaging means.

7. A combination as set forth in claim 5 which includes means on the outer end of the outer hub structure to retract the second support means.

8. In an apparatus to mount an inner reel and an outer reel coaxially, each reel having an axial opening, the combination of:
   an axially inner hub structure to carry the inner reel and an axially outer hub structure coaxially thereof to carry the outer reel, each of the two hub structures being dimensioned to telescope into the axial opening of a reel and having a radially projecting portion to abut the inner face of the reel,
   each hub structure being axially expansible from a contracted state to a limit of axial expansion and being biased to expand to its limit; and
   engagement means carried by each of the two structures tor protrude therefrom into engagement with a reel in response to axial extension of the hub structure, said engagement means being releasable in response to axial contraction of the hub structure, whereby each hub structure may be contracted by the application of manual force to permit a reel to telescope over the hub structure against the projecting portion thereof and then the manual force may be terminated to permit axial expansion of the hub structure with consequent protrusion of the corresponding engagement means to hold the reel against the projecting portion of the hub structure, the radially projecting portion of the outer hub structure being retractable to permit the inner reel to pass over the outer hub structure.

9. A combination as set forth in claim 8 which includes manually operable means on the outer end of the outer hub structure to retract the projecting portion of the outer hub structure.

10. A combination as set forth in claim 8 which includes means carried by the outer hub structure to abut and axially contract the inner hub structure in response to axial contraction of the outer hub structure.

11. In an apparatus to mount an inner reel and an outer reel coaxially wherein each reel has an axial opening with at least one longitudinal groove therein, the combination of:

an axially inner hub structure to carry the inner reel and an axially outer hub structure coaxially thereof to carry the outer reel, each of the two hub structures being dimensioned to telescope into the axial opening of a reel and having a radially projecting portion to abut the inner face of the reel, each hub structure being axially expansible from a contracted state to a limit of axial expansion and being biased to expand to its limit;

engagement means carried by each of the two hub structures to protrude therefrom into engagement with a reel in response to axial expansion of the hub structure, said engagement means being releasable in response to axial contraction of the hub structure, whereby each hub structure may be contracted by the application of manual force to permit a reel to telescope over the hub structure against the projecting portion thereof and then the manual force may be terminated to permit axial expansion of the hub structure with consequent protrusion with the corresponding engagement means to hold the reel against the projecting portion of the hub structure, the radially projecting portion of the outer hub structure being retractable to permit the inner reel to pass over the outer hub structure; and means on each hub structure positioned to extend into at least one longitudinal groove in the axial opening of the corresponding reel to hold the reel against rotation relative to the structure.

12. In an apparatus to mount an inner reel and an outer reel coaxially, each reel having an axial opening, the combination of:

an axially inner hub structure to carry the inner reel and an axially outer hub structure coaxially thereof to carry the outer reel, each of the two hub structures being dimensioned to telescope into the axial opening of a reel, each of the two hub structures comprising an axially inner member and an axially outer member in sliding engagement therewith for axial expansion and contraction of the hub structure, the inner member of each hub structure being axially fixed and having a radially projecting portion to abut the inner face of a reel mounted thereon;

engagement means on each hub structure carried by the outer member thereof and movable radially from an inner retracted position to an outer effective position to press against the inner surface of the axial opening of a reel to hold the reel against axial movement away from the radially projecting portion of the inner member of the hub structure;

spring means in each hub structure to urge the axially outer member thereof axially outward for axial expansion of the hub member;

cam means on each hub structure fixed relative to the inner member thereof in a position across the path along which the engagement means of the hub structure is carried by the outer member thereof when the hub structure expands axially, said cam means being effective to urge the corresponding engagement means radially outward, whereby axial expansion of the hub structure is limited by the presence of a reel thereon and whereby the hub structure may be manually axially contracted to relax the engagement means; and means to limit the radially outward movement of the engagement means of each hub structure by the corresponding cam means in the absence of a reel on the hub structure thereby to limit the axial expansion of the hub structure, the radially projecting portion of the outer hub structure being retractable to permit the inner reel to pass over the outer hub structure.

13. A combination as set forth in claim 12 which includes means carried by the outer member of the outer hub structure to abut the outer member of the inner hub structure when the outer hub structure is axially contracted, whereby the engagement means of the inner hub structure may be retracted by manual axial contraction of the outer hub structure.

14. In an apparatus to mount an inner reel and an outer reel coaxially, each reel having an axial opening, the combination of:

an axially inner hub structure to carry the inner reel and an axially outer hub structure coaxially thereof to carry the outer reel each of the two hub structures being dimensioned to telescope into the axial opening of a reel and having a radially projecting portion to abut the inner face of the reel, each hub structure being axially expansible from a contracted state to a limit of axial expansion and being biased to expand to its limit;

engagement means carried by each of the two hub structures to protrude therefrom into engagement with a reel in response to axial extension of the hub structure, said engagement means being releasable in response to axial contraction of the hub structure, whereby each hub structure may be contracted by the application of manual force to permit a reel to telescope over the hub structure against the projecting portion thereof and then the manual force may be terminated to permit axial expansion of the hub structure with consequent protrusion of the corresponding engagement means to hold the reel against the projecting portion of the hub structure, the radially projecting portion of the outer hub structure being retractable to permit the inner reel to pass over the outer hub structure; and operating means carried by the outer hub structure and extending therefrom towards the inner hub structure to axially contract the inner hub structure in response to axial contraction of the outer hub structure.

15. A combination as set forth in claim 14 in which the engagement means of the outer hub structure is released at an intermediate point in the axial contraction of the outer hub structure and in which said operating means is positioned and dimensioned to contract the inner hub structure to the point of releasing the engagement means thereof after the engagement means of the outer hub structure is released.

16. A combination as set forth in claim 15 in which said operating means is normally spaced away from the inner hub structure when the outer hub structure is fully expanded and in which the operating means is dimensioned to make operating contact with the inner hub structure after the outer hub structure is contracted to the point of releasing the engagement means of the outer hub structure.

17. In a rotary device for releasably mounting a reel that has an axial opening therein, the combination of:

an axially inner rotary member fixed against axial movement, the inner member having a radial projecting portion to abut the inner face of the reel;

an axially outer member in sliding engagement with the inner member for axial movement relative to the inner member;

spring means acting between the two members to urge the outer member axially outward from the inner member, the two members constituting an axially extensible and contractible hub structure dimensioned to telescope into the axial opening of the reel;

stop means to limit relative outward movement of the outer member thereby to limit axial extension of the hub structure; and engagement means carried by one of the two members of the hub structure to protrude radially outward therefrom against the inner surface of the axial opening of the reel in response to axial extension of the hub structure, thereby to hold the reel against axially against axially outward movement away from the projection portion of the inner member, said engagement means relaxing in response to axial contraction of the hub structure, whereby the reel may be telescoped over the hub structure by manual force to encounter the protruding engagement means and thereby retract the outer member towards the inner member in opposition to the spring means to relax the engagement means to permit the reel to move into position against the projecting portion of the inner member and whereby relaxing the manual force permits radial extension of the hub structure by the spring means to cause the engagement means to protrude into engagement with the reel to hold the reel against axial movement away from the projecting portion of the inner member.

18. A combination as set forth in claim 17 in which the engagement means is carried by the outer member.

References Cited

UNITED STATES PATENTS

| | | | |
|---|---|---|---|
| 2,709,051 | 5/1955 | Bunch | 242—68.3 |
| 3,124,319 | 3/1964 | Cohen | 242—68.3 |

FRANK J. COHEN, *Primary Examiner.*

STANLEY N. GILREATH, N. L. MINTZ, *Assistant Examiners.*